July 30, 1940.    F. MEYER    2,209,739
METHOD OF SHAPING TUBES
Filed May 26, 1936
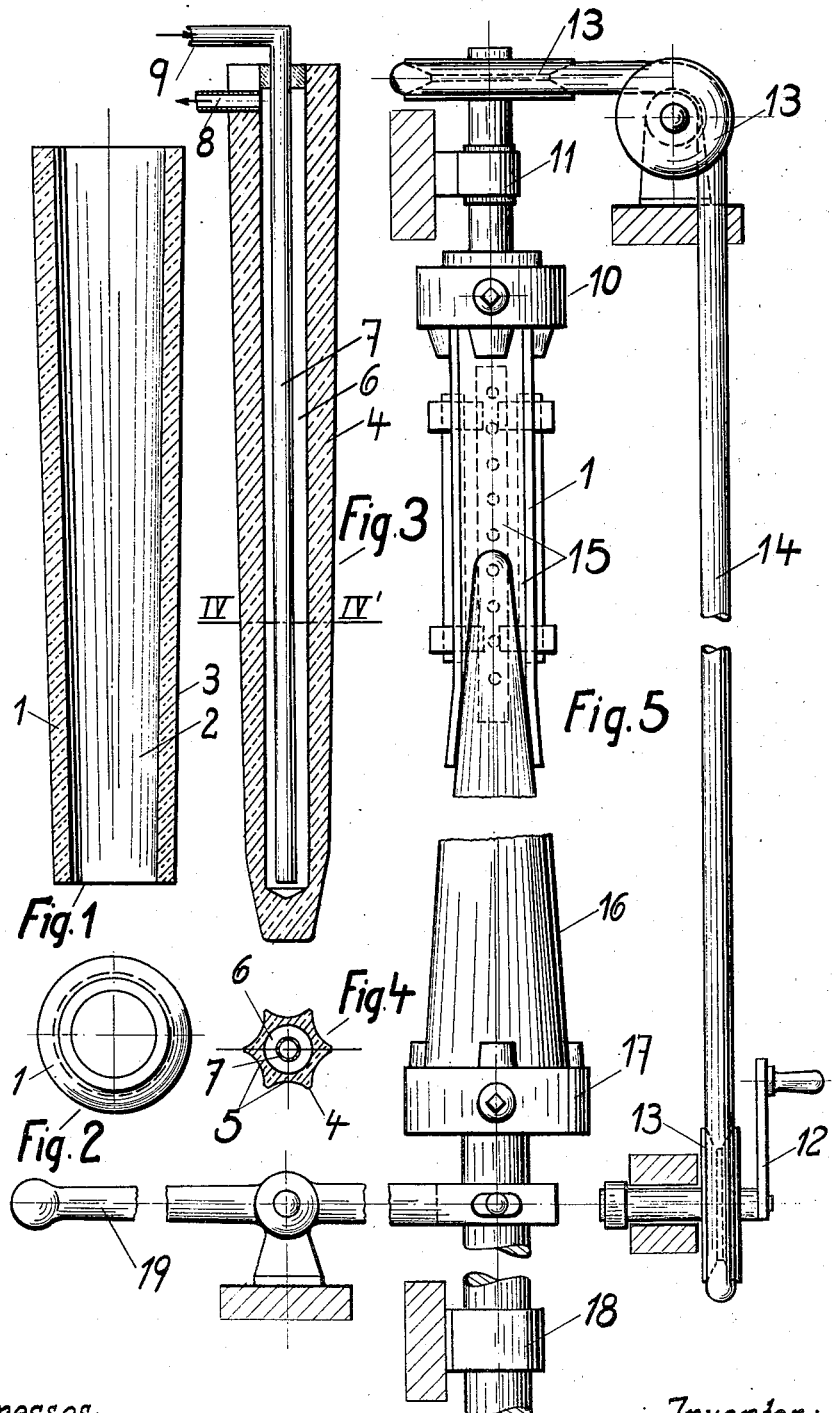

Patented July 30, 1940

2,209,739

UNITED STATES PATENT OFFICE 2,209,739

METHOD OF SHAPING TUBES

Felix Meyer, Aachen, Germany, assignor to Kimble Glass Company, Vineland, N. J., a corporation of Illinois Application May 26, 1936, Serial No. 81,867
In Germany June 8, 1935

1 Claim. (Cl. 49—84)

My invention relates to a method of shaping tubing, and more particularly to the reshaping of tubing to produce a uniformly tapered thermoplastic tube.

My invention especially refers to the manufacture of tubes for flow meters having a regular conical inside profile of high brilliancy by reforming ordinary tubes into tubes which show the above mentioned quality. The reforming is done while the tubes are in a plastic state which is achieved by reheating these tubes nearly to the melting point. In this plastic state each single tube is reformed by means of a polygonal conical mandrel which is introduced into one open end of the tube and which causes the plastic part of the tube to expand in such a way that its inside diameter corresponds with the outside diameter of the mandrel.

This process of expanding cannot be carried out by a single introduction of said mandrel, because its coming into contact with the tube from the inside takes away part of its heat and plasticity and thereby stiffens or hardens it in such a way that further heating is necessary for proceeding with the reformation of the tube. For this reason the mandrel has to be withdrawn while the plastifying process is again taken up. As soon as the plasticity of the tube has again reached a degree which allows a further reforming the mandrel again is introduced and a further part of the tube is expanded at the same time as the firstly expanded part is expanded further. This process is repeated as often as it is necessary for introducing the mandrel as far as desired. The plastification of the tube is effected by means of burners supplied with gas and air or if necessary gas and oxygen or by other heating means f. i. small electric furnaces. At first the end into which the mandrel is introduced has to be made more plastic than the next part of the tube because the less plastic part serves as a holder or skeleton for the more plastic part but eventually the whole part of the tube which is to be reformed becomes plastic holding its form only because of the cooling influence of the mandrel which after each period of reheating the tube gives it a new hold after having expanded it as much as possible. Finally the whole tube except the part which is held in a holder is alternatively plastic and stiff until the heat finally can be taken away and the tube can cool down without further altering its form. During the whole process the tube or the mandrel is rotated. It is more advisable to rotate the tube in order to better expose each part of its periphery uniformly to the effect of the flames but in case of the application of an electric furnace, which gives an equal heat, all round the tube, it may as well not rotate. In this case the mandrel has to rotate. The rotation of the tube or the mandrel should not be interrupted during the whole process but the speed of the rotation may vary as well as the direction of the rotation, when the mandrel has been withdrawn a slow rotation of the tube is advisable, but from the moment when the mandrel is being introduced till it leaves the tube the rotation should be accelerated as much as possible.

The mandrel must consist of a heat resisting material the best material for reforming tubes of glass being carbon. It is advisable to use a hollow mandrel and to lubricate it with oil or wax or a suitable mixture of wax and rubber. It is also advisable especially in the case of long mandrels and tubes and in the case of big diameters and especially when the glass tubes have a thick wall and consist of a material which requires a great heat to render it plastic, to send a current of a cooling liquid through the whole length of the inner part of the mandrel in order to keep it sufficiently cold to cool down the tube after each period of expanding it. The mandrel should be closed at its upper smaller end as well as at the other end in order to allow a circuit of the cooling liquid avoiding any leakage of such liquid which might make the tube crack.

In case both tube and mandrel are being rotated they must rotate in opposite directions or at different speeds. The rotating direction should be reversed after each operation. Owing to the fact that the plastified part of the tube as soon as it has reached the proper degree is being caught, held, expanded and cooled down by the mandrel it is necessary to hold the tube perpendicularly, but it might be held in a horizontal or any other direction. If necessary the mandrel need not altogether be drawn out of the tube after each expanding action but it might be withdrawn as far as necessary thus lending to a horizontally held tube a certain hold or help in case it should become too soft and likely to bend.

The apparatus for executing the above explained process comprises a holder to hold the tube, a holder to hold the mandrel, a heating device, for instance a burner or a set of burners for heating the tube, and, if necessary a system of pipes and basins for producing a circuit of the cooling liquid. The holders should be mounted in bearings in which they can be rotated and either the holder for the tube or the holder for the mandrel should be provided with means for sliding forward and backward. This sliding should be achieved with as little friction and force as possible and a counterweight or a long lever should facilitate the sliding movement in order to allow the hand which guides the sliding part to feel exactly how far the mandrel may be introduced and how soon it must be withdrawn. The whole process requires some skill but after the above disclosed directions it can be handled by any person who has some experience in the working of glass tubes or tubes of other thermoplastic material. The holders for the tube and eventually for the mandrel are connected with revolving devices but the revolving should be done by means of a handle and by hand because the person who handles this work should at any time during the process be able to regulate the speed as well as the direction of the rotation. By this process the inner surface of the tube especially in the case of glass tubes till it cools down remains plastic so that the surface remains glazed and brilliant and does not show any effect of the expanding treatment to which the tube has been exposed. Apart from the great exactitude and variety of the cone which can be made by this invention the great advantage of it lies in preserving the full brilliancy and smoothness of the inner surface of the reformed tubes.

Having now duly described the new article of manufacture the process of manufacture and the apparatus for the manufacture I must mention that by using such process and such apparatus an article of manufacture can be produced which, though similar articles manufactured by different processes are known, must be considered as an altogether new product.

This product is a tube of glass or other thermoplastic material not only in the form of a regular cone but at the same time having a brilliant melted and glazed inner surface. By no previous process were both these qualities obtainable. When a regularly progressing cone was obtained by grinding the tube from the inside, the inner surface lacked brilliancy. When the regularly progressing cone was produced by letting an evacuated tube collapse on a mandrel the brilliancy and transparency suffered by the film of grease or the like which was necessary to free the tube from the mandrel when the process was finished.

In the drawing I have illustrated one example of my invention, namely of the product of the mandrel and of the apparatus. By this drawing I do not restrict myself in any way to the details illustrated by said drawing.

In the drawing, Fig. 1 is a longitudinal section of a preferred form of conical tube;

Fig. 2 is a top view of the tube shown in Fig. 1;

Fig. 3 is a longitudinal section of a hollow mandrel and means for cooling the same;

Fig. 4 is a section of the mandrel shown in Fig. 3 taken on line IV—IV'; and

Fig. 5 is a fragmentary front view of the complete apparatus.

I shall now describe the details of the figures.

The tube 1 (Fig. 1) has a regularly progressing conicity of about 2,5 degrees as desirable for flow meter tubes in order to give them a normal measuring capacity.

The inside wall 2 of the tube 1 (Fig. 1) has a brilliantly glazed melted surface which gives to the tube a great transparency avoiding wall friction of the flowing medium, avoiding precipitation of ingredients in the medium and increasing the mechanical and chemical resistance of the tube.

The outer surface 3 of tube 1 is provided with calibrated graduations as is customary in flow meters.

The mandrel according to Figs. 3 and 4 has a cross section in the form of a regular hexagon or a star. The outer ribs 4 are narrow in order to give little contact to the inside of the tube when reforming it.

The intervals 5 between the protruding ribs 4 may have any suitable form. They serve for taking up part of the grease.

The interior of the mandrel forms a chamber 6 in which is disposed a long pipe 7. The chamber 6 and the pipe 7 have fittings 8 and 9 to communicate with a system for introducing and discharging the cooling liquid.

In the apparatus shown in Fig. 5 the tube 1 to be reformed is held in the holder 10 which is held in a bearing 11 in which it can be rotated by the handle 12 over the rope pulleys 13 through the rope 14.

By means of the burners 15 the tube can be plastified at will along its length. The mandrel 16 is held in the holder 17 which can slide in the slide guide 18 by means of the lever 19 thus moving the mandrel forward and backward.

What I claim is:

A process for reforming a tube of thermoplastic material into a tube having a regularly progressing inside conical surface consisting in reheating said tube nearly to its melting point and expanding said tube from one open side by introducing a tapered polygonal mandrel the outer diameter of which corresponds with the inner diameter of the tube when reformed, effecting relative rotation of the tube and mandrel, and cooling the mandrel during the reforming step.

FELIX MEYER.